United States Patent [19]

Power et al.

[11] Patent Number: 5,277,889
[45] Date of Patent: Jan. 11, 1994

[54] METHOD FOR DEPOSITING PURE METAL HALIDE COMPOSITIONS

[75] Inventors: Joseph M. Power, Corning; Ahmad Sarhangi, Painted Post, both of N.Y.

[73] Assignee: Corning Incorporated, Corning, N.Y.

[21] Appl. No.: 733,203

[22] Filed: May 13, 1985

Related U.S. Application Data

[63] Continuation-in-part of Ser. No. 544,130, Oct. 21, 1983, abandoned.

[51] Int. Cl.$^5$ ................................................ C01B 9/00
[52] U.S. Cl. ...................................... 423/491; 65/3.12; 65/18.2; 65/DIG. 16; 423/263; 423/489; 423/490; 423/492; 423/493; 423/495; 423/496; 423/497; 423/498
[58] Field of Search .............. 423/489, 490, 499, 491, 423/492, 493, 263, 495, 496, 497, 498, 499; 65/3.12, 18.2, DIG.

[56] References Cited

U.S. PATENT DOCUMENTS

| | | | |
|---|---|---|---|
| 4,065,280 | 12/1977 | Kao et al. | 65/3 A |
| 4,378,987 | 4/1983 | Miller et al. | 65/3.12 |
| 4,501,602 | 2/1985 | Miller et al. | 65/18.2 |
| 4,610,708 | 9/1986 | Sarhangi et al. | 65/3.12 |
| 4,627,865 | 12/1986 | Roba | 65/3.12 |
| 4,718,929 | 1/1988 | Power et al. | 65/3.12 |

OTHER PUBLICATIONS

Guralnik "Webster's New World Dictionary of the American Language", 2nd Col. Ed., p. 588, World Publ. Co. (1970) New York.

*Primary Examiner*—Edward A. Miller
*Attorney, Agent, or Firm*—Kees van der Steere

[57] ABSTRACT

Metal halide compositions of enhanced purity are produced by vapor phase deposition via reactions involving organometallic starting materials in a process wherein a carbon getter is provided in the reaction zone and/or adjacent the developing metal halide deposit. The carbon getter reduces carbon contamination in the product which can result from side decomposition reactions involving the organometallic starting materials.

3 Claims, 1 Drawing Sheet

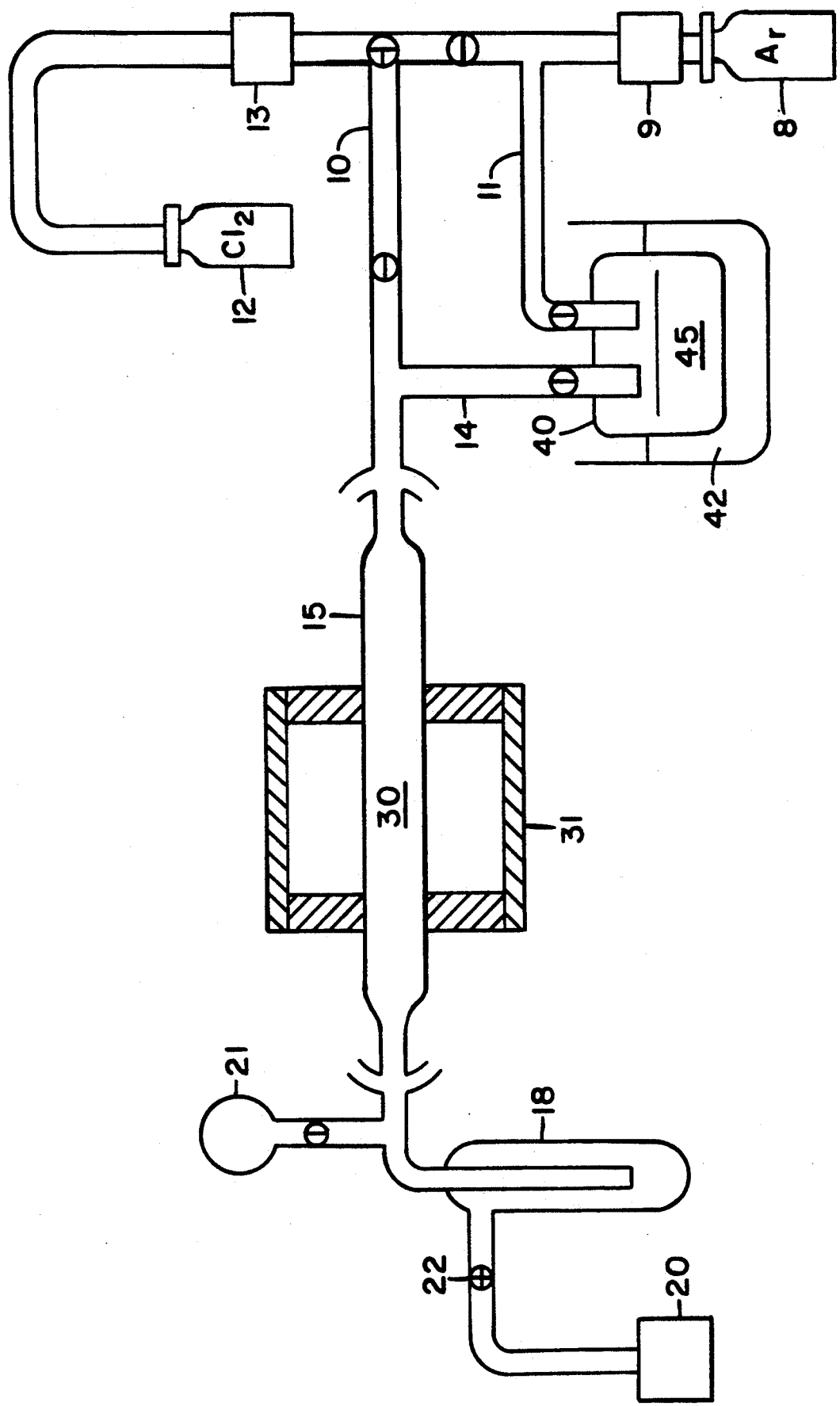

METHOD FOR DEPOSITING PURE METAL HALIDE COMPOSITIONS

The Government has rights in this invention pursuant to Contract No. N00014-82-C-2314 awarded by the Department of the Navy.

This application is a continuation-in-part of prior copending application, Ser. No. 544,130, filed October 21, 1983, now abandoned.

BACKGROUND OF INVENTION

The present invention relates to the manufacture of pure metal halides which can be used, for example, in the manufacture of pure metal halide glasses or the like. More particularly, the invention relates to the manufacture of metal halides by vapor phase deposition processes wherein metal halide deposits of enhanced purity may be obtained.

Metal halide compositions are presently of interest in connection with the development of new, transparent glassy materials exhibiting unique optical properties. For example, in the field of glass optical waveguides, which are transparent glass filaments used to transmit light signals for communication purposes, glasses of improved transparency are continually being sought.

Commercial glass optical waveguides are presently formed of oxide glass materials, typically fused silica and doped fused silica glasses. Improvements in such materials have continued to the point where loss coefficients near the theoretical minimum of 0.1 db/km at 1.6 microns have been achieved. However, it has been recognized that even lower attenuations, perhaps as low as 0.001 db/km, might be attainable in halide glass systems which can operate at wavelengths further into the infrared region. Among the halide glasses which have been considered for the manufacture of extremely low loss optical waveguide fibers are glasses based on $BeF_2$, $ZrF_4$ and $ZnCl_2$.

Examples of patents disclosing the use of metal halide glasses for infrared transmitting optical devices are U.S. Pat. Nos. 4,189,208, 4,308,066, and 4,343,638. These patents, however, teach preform or filament manufacture by conventional batch melting and forming methods.

Vapor deposition methods for making metal halide compositions are disclosed in U.S. Pat. No. 4,378,987 and in published Japanese Patent Application No. 57-051146. These publications recognize that vapor deposition methods may be needed to achieve the purity necessary for very low attenuation optical products.

In the method of U.S. Pat. No. 4,387,987, a particulate metal halide precursor such as a metal fluoride powder is generated and deposited on a preform substrate by reacting a vaporous metal source such as an organometallic compound (e.g., a metal alkyl or a metal beta-diketonate) with a vaporous halogen source such as HF. The reactive vapors are flowed into a reaction zone adjacent the substrate where they react to form the precursor, and this precursor is directly deposited on the substrate where it can be further processed by consolidation to form a transparent optical preform or fiber.

Another approach to the formation of pure metal halide precursor materials involves the controlled decomposition of a halogenated metal beta-diketonate to form a metal halide in the absence of added halogenating agents. In this procedure, the halogenated metal beta-diketonates are transported into a reaction zone where they are decomposed by heat or plasma energy, the resulting metal halide product being formed by intramolecular fluorine transfer and thereafter deposited on an adjacent substrate. Methods for carrying out these procedures are described and claimed in the copending, commonly assigned application of J. M. Power et al., Ser. No. 544,129, filed October 21, 1983, now U.S. Pat. No. 4,718,929.

In these and other vapor phase methods for making pure metal halide compositions involving the use of organometallic starting materials, contamination of the metal halide deposit by pyrolytic carbon from organic substituents in the starting materials can occur if the reaction is not fully controlled. Avoidance or minimization of the carbon contamination may be desirable where some important property of the metal halide, such as its optical transparency, is undesirably affected thereby.

It is therefore a principal object of the present invention to provide a procedure whereby unwanted carbon contamination in metal halide deposits produced by vapor phase deposition processes may be minimized or prevented.

Other objects and advantages of the invention will become apparent from the following description thereof.

SUMMARY OF THE INVENTION

In accordance with the present invention carbon contamination of a metal halide deposit produced by vapor deposition from an organometallic reactant is reduced or avoided by reacting the vapor deposition products with a carbon getter, preferably by providing the getter in the reaction zone during the vapor deposition reaction. This carbon getter operates to combine with and transport out of the reaction zone any pyrolytic carbon generated during the reaction. Thus the incorporation of precipitated free carbon within the growing metal halide deposit is avoided.

Carbon getters useful in accordance with the invention may be characterized as gases which will react with carbon to form gaseous or volatile products. For example, oxygen, halogens, and compounds of these elements can react with carbon to form volatile or gaseous carbon halides or carbon dioxide which are readily transportable along with other by-products of the vapor deposition reaction.

The use of a carbon getter in accordance with the invention can be effective in any of the known vapor deposition processes for depositing metal halides which employ organometallic compounds as sources for the selected metals and are conducted under reaction conditions wherein pyrolytic carbon is generated. The organometallic compounds may be metal alkyls, metal alkoxides, metal $\beta$-diketonates, halogenated metal $\beta$-diketonates, or any other of the various volatile, carbon-containing metal compounds proposed for use in such processes.

BRIEF DESCRIPTION OF THE DRAWING

The invention may be further understood by reference to the drawing, which schematically illustrates apparatus suitable for carrying out a metal halide vapor deposition process in accordance with the invention.

DETAILED DESCRIPTION

Conventionally, vapor deposition processes for metal halide production involve transporting the selected organometallic compounds in a suitable vapor stream to a reaction zone where they are reacted under selected conditions to form the metal halide, which is thereafter either collected or directly deposited on a suitable substrate. If pyrolytic carbon is formed by decomposition of the organic substituents of the organometallic starting materials under the reaction conditions employed, it will typically be incorporated directly in the desired metal halide product and, once incorporated, is not easily removed.

The generation of pyrolytic carbon appears to be favored by thermal or plasma conditions in a vapor phase reaction zone which break down the organic substituents of the organometallic starting materials. Such conditions have been found to exist in vapor deposition processes wherein halogenated organometallic compounds, e.g. halogenated beta-diketonates, are converted directly to metal halides by intramolecular halogen transfer reactions promoted by thermal decomposition in the absence of added halogenating agents such as HF.

Examples of carbon getters which may be used to reduce the pyrolytic carbon content of vapor-deposited metal halides in accordance with the invention are $CF_4$, $CCl_3F$, $SiF_4$, $CO_2$, $O_2$, $Cl_2$, $NF_3$ and $F_2$. The preferred carbon getters for use in the invention are $CCl_3F$, $Cl_2$, $NF_3$ and $F_2$. The amount of getter effective to reduce the carbon content of the metal halide product depends upon the selection of the getter, and upon the particular reaction path and reaction conditions employed, but can readily be determined by routine experiment.

Carbon getters such as $F_2$, $NF_3$, $Cl_2$ and even $O_2$ can be very effective under relatively low-energy reaction conditions such as encountered in thermally driven halide deposition reactions. Getters such as $CF_3$ and $CCl_3F$ require higher energies in order to undergo the dissociation needed for effective gettering, and are thus to be utilized primarily in plasma-driven processes.

The gettering agents $F_2$ and $NF_3$ are effective in either plasma or thermally-driven halide deposition processes, and are thus among the most preferred of the effective compounds. $Cl_2$, while somewhat less effective, is advantageously less corrosive to the reaction environment. Further, no tendency to form chlorides when metal fluoride products are being treated has been observed. Oxygen has a tendency to form metal oxides in the reaction zone, but is quite useful where a metal oxide-containing halide deposit is desired.

The method of the invention can be used in the vapor deposition of any desired metal halide or combinations of metal halides, but is particularly useful in the manufacture of halide glasses. These are non-crystalline or amorphous metal halide compositions which, in some cases, exhibit desirable optical properties such as high infrared transparency. Important components of some of these halide glasses are $BeF_2$, $ZrF_4$, $ZnCl_2$ and other halides, including chlorides, fluorides, bromides and iodides of metals selected from the group: Be, Zr, Zn, Cd, Al, Mg, Cu, Y, Hf, Ti, Ga and Ce. Alkali metal halides may also be present in some of these glasses.

Carbon getter gases can be used with any of the vapor deposition apparatus used in the prior art for the vapor deposition of glass materials, by adding a provision for introducing the gas into the reaction zone in the same manner as the carbon-containing source compounds selected for use in forming the deposit. The getter can be introduced sequentially, i.e., after a deposit of metal halide has accumulated, or it can be introduced simultaneously with the reactants used for halide deposition. The latter procedure is preferred.

Apparatus for vapor-depositing metal halides by the thermal decomposition of organometallic compounds, and including a provision for introducing a getter gas into the vapor stream, is shown in the drawing. Referring specifically to the drawing, a carrier gas for an organometallic source compound, such as argon, is supplied from source 8 and can be delivered to the reaction apparatus via either of delivery lines 10 or 11, after metering through mass flow controller 9. Getter gas source 12 is also provided, containing a getter gas such as chlorine which can be metered through flowmeter 13.

While line 11 is in use, the argon carrier is passed into vaporization chamber 40 which can be heated by means of oil bath 42. Argon introduced into chamber 40 picks up vapors of a heated organometallic compound 45, such as Al(hfa)$_3$, and transports them via glass delivery line 14 to glass reaction tube 15. Delivery line 14 is optionally provided with heating means such as an electrical heating tape for use where compound 45 tends to condense in the line. Chlorine getter gas from source 12 is introduced into the vapor stream as desired via line 10.

Organometallic vapors, mixed with carrier gases and oxygen, flow into tube 15 and are conveyed through reaction zone 30, which is that section of tube 15 within the hot zone of electrically heated furnace 31. The vertical walls of furnace 31 can be horizontally moved to adjust the length of the reaction zone.

Metal halides produced by the thermal decomposition of the source compound in the reaction zone are non-volatile and are deposited on the walls of tube 15 within or beyond reaction zone 30. Volatile by-products of the decomposition are transported out of the reaction zone and may be condensed in optional trap 18 or removed by scrubbing. Pressure in the reaction zone is monitored by gauge 21, and can be controlled by source 20 and needle valve 22.

The following illustrative examples show the operation of apparatus such as described with and without the use of a getter gas according to the invention.

EXAMPLE I

To provide a quantity of AlF$_3$ for use, for example, in the preparation of an infrared-transmitting halide glass, a quantity of pure Al(hfa)$^3$, a white, crystalline compound melting at 73° C., is provided in the vaporization chamber and heated to 80° C. The furnace is then heated to 500° C. and the delivery line 14 to 120° C., while argon at a flow rate of about 400 cc/min. is passed through reaction tube 15 via delivery line 10. System pressure is maintained at about 100 mm (Hg) by vacuum source 20.

The reaction tube is formed of Corning Code 7740 glass, a heat resistant borosilicate glass having a thermal expansion coefficient of about $33 \times 10^{-7}$/°C. and good chemical durability. The tube has an inside diameter of about 22 mm, and the length of tube in the hot zone of the furnace is about 12 inches.

After the described conditions have been established, argon flow is diverted from tube 10 into tube 11 and through chamber 40 where Al(hfa)$_3$ vapors are picked up and transported through tube 14 and into reaction tube 15 and zone 30. As the thermal decomposition of the Al(hfa)₃ commences in the reaction zone, a grey deposit forms on the walls of reaction tube 15 in the reaction zone. Vapor flow is continued for about 1½ hours, and then argon flow is rediverted from tube 11 to tube 10 to clear the stream of organometallic vapors. The furnace is then allowed to cool, reaction tube 15 is removed, and a sample of the grey deposit is taken for analysis. X-ray diffraction and chemical analysis identify the product as substantially pure AlF₃, but containing about 0.2% carbon as an impurity.

The effectiveness of a getter gas in reducing carbon contamination in a metal halide product deposited under similar conditions is shown by the following example.

EXAMPLE 2

The steps of Example 1 above are repeated, except that a getter gas for carbon, consisting essentially of pure chlorine, is introduced into the reaction zone during the decomposition reaction. Referring to the drawing, this chlorine is provided by chlorine source 12 and is metered by flowmeter 13 which includes a valve for controlling the flow of oxygen into the reaction tube.

The vapor stream introduced into reaction tube 15 includes a carrier gas comprising 50% Cl₂ and 50% Ar by volume, this mixture passing through the reaction tube at a rate of 100 cc/min. The reaction tube is 31 mm in diameter and the reaction zone is 6 inches in length. System pressure is maintained at 130 mm (Hg) during the run.

With the furnace operating at 500° C., the argon flow is diverted from line 10 to line 11 and through vaporization chamber 40 which is maintained at 80° C. Heated Al(hfa)₃ vapors are picked up by the argon and transported into the reaction zone with the chlorine getter gas from source 12.

Under the described conditions a white deposit is formed on the walls of the tube 15 in the reaction zone. After a run of one hour, the argon is rediverted from tube 11 (and the vapor generator) to tube 10 and, after flushing the reaction tube with the pure argon-chlorine carrier mixture, the gas flows are shut off and reaction tube 15 removed from the system. Analysis identifies the deposited product as principally AlF₃, with essentially no pyrolytic carbon and no aluminum chloride present in the deposit. This result is attributed to the effectiveness of the getter gas which prevents pyrolytic carbon formation.

Thus, the use of a carbon getter has been found to be an effective method for reducing the carbon content of vapor-deposited metal halide compositions and is expected to significantly improve the purity and optical quality of products such as metal halide glasses produced therefrom.

We claim:

1. In a method for forming a metal halide product by a vapor deposition process wherein a halogenated beta-diketonate of a selected metal is vaporized and transported in a vapor stream into a reaction zone wherein it is decomposed under selected reaction conditions to form carbon and a deposited halide of the selected metal, the improvement characterized in that a gas selected from the group consisting of $CF_3$, $CCl_3F$, $SiF_4$, $CO_2$, $O_2$, $Cl_2$, $NF_3$ and $F_2$ is introduced with the halogenated beta-diketonate into the reaction zone, said gas reacting with the carbon and thereby reducing the carbon content of the deposited metal halide.

2. A method in accordance with claim 1 wherein the metal halide is a metal fluoride and the halogenated metal beta-diketonate is a fluorinated metal beta-diketonate.

3. A method in accordance with claim 2 wherein the gas is $CCl_3F$, $Cl_2$, $NF_3$ or $F_2$.

* * * * *

UNITED STATES PATENT AND TRADEMARK OFFICE
CERTIFICATE OF CORRECTION

PATENT NO. : 5,277,889
DATED : January 11, 1994
INVENTOR(S) : Joseph M. Power and Armad Sarhangi It is certified that error appears in the above-identified patent and that said Letters Patent is hereby corrected as shown below:

Col. 3, line 39, "$CF_3$" should be "$CF_4$"

Col. 4, line 52, "$Al(hfa)^3$" should be "$Al(hfa)_3$"

Col. 6, line 27, "$CF_3$" should be "$CF_4$"

Signed and Sealed this

Fourteenth Day of June, 1994

BRUCE LEHMAN

*Attest:*

*Attesting Officer*      *Commissioner of Patents and Trademarks*